United States Patent
Akcay et al.

(10) Patent No.: US 11,994,371 B2
(45) Date of Patent: May 28, 2024

(54) TEST SYSTEM FOR THROWING MECHANISMS

(71) Applicant: TUSAS—TURK HAVACILIK VE UZAY SANAYII ANONIM SIRKETI, Ankara (TR)

(72) Inventors: Ali Akcay, Ankara (TR); Onur Imece, Kazan/Ankara (TR); Sabri Senturk, Kazan/Ankara (TR); Nihat Serkan Akcay, Kazan/Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 642 days.

(21) Appl. No.: 17/263,687

(22) PCT Filed: Aug. 7, 2019

(86) PCT No.: PCT/TR2019/050662
§ 371 (c)(1),
(2) Date: Jan. 27, 2021

(87) PCT Pub. No.: WO2020/112049
PCT Pub. Date: Jun. 4, 2020

(65) Prior Publication Data
US 2021/0239441 A1    Aug. 5, 2021

(30) Foreign Application Priority Data
Aug. 8, 2018    (TR) .................................. 2018/11493

(51) Int. Cl.
*F42B 35/00* (2006.01)
*B64D 1/02* (2006.01)
*F41F 5/00* (2006.01)

(52) U.S. Cl.
CPC ................ *F42B 35/00* (2013.01); *B64D 1/02* (2013.01); *F41F 5/00* (2013.01)

(58) Field of Classification Search
CPC ..... F41F 5/00; B64D 1/02; B64D 1/04; F42B 35/00
See application file for complete search history.

(56) References Cited

U.S. PATENT DOCUMENTS 2,078,166 A * 4/1937 Schwerin ................... F41J 9/20
124/43
3,659,462 A * 5/1972 Cole ........................ B64D 1/04
73/865.9
(Continued)

FOREIGN PATENT DOCUMENTS

CN     202693178 U    1/2013
CN     103644995 A    3/2014
(Continued)

OTHER PUBLICATIONS

International Search Report and Written Opinion for corresponding PCT application No. PCT/TR2019/050662, dated Jun. 15, 2020.
(Continued)

*Primary Examiner* — Andre J Allen
(74) *Attorney, Agent, or Firm* — Notaro, Michalos & Zaccaria P.C.

(57) ABSTRACT

A test system is disclosed that has a chassis, a throwing mechanism that is located at an upper part of the chassis onto which at least one weight is attached and which provides throwing the weight attached thereon, a base is located at a lower part of the chassis and onto which a weight is thrown by the throwing mechanism, a control unit for throwing the weight by the throwing mechanism, and at least one pushing member for throwing the weight by pushing which is located on the throwing mechanism and operated by the control unit.

11 Claims, 3 Drawing Sheets

(56) References Cited

U.S. PATENT DOCUMENTS

| | | | |
|---|---|---|---|
| 5,351,597 A | 10/1994 | Holmstrom | |
| 11,306,992 B2 * | 4/2022 | Akcay | G01M 99/008 |
| 2021/0164757 A1 * | 6/2021 | Akcay | F41A 19/58 |
| 2021/0247275 A1 * | 8/2021 | Akcay | G01M 99/005 |

FOREIGN PATENT DOCUMENTS

| | | | |
|---|---|---|---|
| CN | 105865743 B | | 8/2018 |
| MY | 154714 A | | 7/2015 |
| WO | WO-2023055323 A1 | * | 4/2023 |

OTHER PUBLICATIONS

International Preliminary Report on Patentability for corresponding PCT application No. PCT/TR2019/050662, completed Dec. 17, 2020.

* cited by examiner

TEST SYSTEM FOR THROWING MECHANISMS

FIELD

The present invention relates to systems in which life tests are performed for the throwing mechanisms that provide throwing a weight to a target point.

BACKGROUND

In order to release or throw ammunition to a target point, throwing mechanisms are used in air vehicles. In addition, for various carrying systems, there exists throwing mechanisms for holding or releasing or throwing a weight. Life tests of said throwing systems are generally performed such that a weight is repeatedly attached to the throwing mechanism by manpower.

U.S. Pat. No. 5,351,597A covered by the known art discloses a reliable release system which is able to operate in accordance with different types of ammunition. The system comprises an electronic system and an ammunition carrying unit with electrical characteristics suitable for different types of ammunition. An indication unit is provided in the ammunition carrying unit, which indicates the ammunition type that is placed at the carrying unit. Said ammunition is released by a control unit which is provided in said system. However, life test of the ammunition system is not mentioned.

In the known art, life tests of throwing mechanisms are carried out by manpower. Weight that is thrown out of the throwing mechanism is re-attached to the throwing mechanism by manpower so that the throwing mechanism is operated once again. This process may be repeated over and over. Life test is performed for the throwing mechanism itself.

Performing re-attaching process of the weight to the throwing mechanism by a human causes various work-related accidents, test errors and/or time losses.

Thanks to the test system of the present invention, throwing mechanisms which are used in air vehicles to throw ammunition can be tested independently of the manpower; thus an easy-to-use, practical, effective, efficient and reliable test system is achieved.

Another object of the present invention is to provide a test system for performing life tests of throwing mechanisms in an automated and controlled manner.

A further object of the present invention is to provide a test system which provides performing tests of throwing mechanisms independently of manpower.

Yet another object of the present invention is to provide a simple, easy-to-use, practical, effective, efficient and reliable test system.

SUMMARY

The test system for achieving object of the present invention which is defined in the first claim and the dependent claims thereof comprises a chassis; a throwing mechanism which is located at an upper part of the chassis; a weight which is attached to the throwing mechanism for being thrown; a base which is located at a lower part of the chassis and onto which a weight falls; a control unit for throwing the weight out of the throwing mechanism by pushing, thus enabling a fatigue test to be performed on the throwing mechanism; and at least one pushing member which is located on the throwing mechanism, operated by the control unit and extends to the weight for throwing the weight downwards by pushing.

The test system of the present invention comprises at least one adjuster which is located on the chassis such that it is able to move towards or away from the pushing member, operated by the control unit and which moves the pushing member so that the pushing member contacts and/or touches the weight.

In an embodiment of the invention, the test system comprises an adjuster which enables the pushing member to move up and down by rotating clockwise or counter clockwise around its own axis.

In an embodiment of the invention, the test system comprises a pushing member which has a first position (I) on the throwing mechanism, a second position (II) in which the pushing member moves downwards from the first position (I) by being rotated around its own axis by means of the adjuster and contacts the weight, and a third position (III) in which the pushing member moves downwards sufficient to push the weight out of the throwing mechanism by means of the control unit and which provides throwing the weight by pushing it downwards.

In an embodiment of the invention, the test system comprises a pushing member which is pulled upwards from the third position (III) by means of the control unit so as to be brought into the first position (I), and has a fourth position (IV) in which the pushing member is lifted from the first position (I) to a predetermined height by being rotated around its own axis by means of the adjuster.

In an embodiment of the invention, the test system comprises a motor, and an adjuster having at least one transfer member which is triggered by the motor so as to make a rotational movement around its own axis.

In an embodiment of the invention, the test system comprises a transfer member whose rotational movement around its own axis terminates upon contact of the pushing member to the weight.

In an embodiment of the invention, the test system comprises a transfer member whose rotational movement around its own axis terminates upon contact of the pushing member to the weight due to the power of motor, wherein the torque power of the motor is lower than the frictional force that is created by contact of the pushing member to the weight.

In an embodiment of the invention, the test system comprises at least one guide which is located on the pushing member, actuated by the transfer member, and by this way, provides rotation of the pushing member around its own axis.

In an embodiment of the invention, the test system comprises a transfer member in the form of a gear wheel, and a guide in the form of a gear wheel.

In an embodiment of the invention, the test system comprises a transfer member having a longer or wider gear structure than the guide.

In an embodiment of the invention, the test system comprises at least one housing located on the throwing mechanism, at least one hook located in the housing, and at least one ring which is located on the weight, extends outwards from the weight and provides attaching the weight to the throwing mechanism by the hook when the weight is attached to the throwing mechanism.

In an embodiment of the invention, the test system comprises a throwing mechanism used in air vehicles to throw ammunition.

In an embodiment of the invention, the test system enables a life test to be performed automatically on the throwing mechanism which is used in air vehicles.

BRIEF DESCRIPTION OF THE DRAWINGS

The test system realized to achieve the object of the present invention is illustrated in the attached drawings, in which.

DETAILED DESCRIPTION

Figure 1:
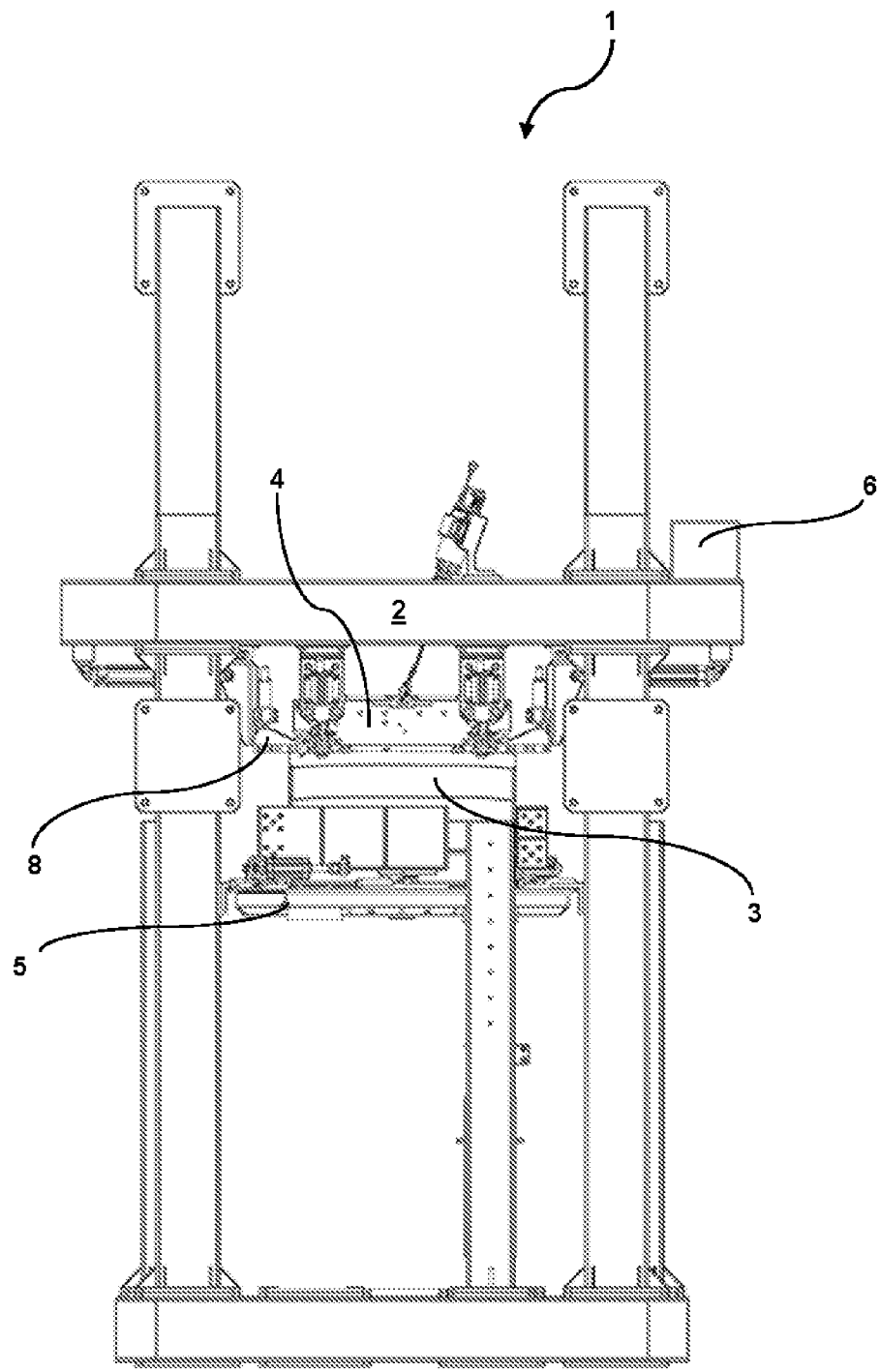
FIG. 1 is a front view of a test system.

All the parts illustrated in figures are individually assigned a reference numeral and the corresponding terms of these numbers are listed below:
1. Test System
2. Chassis
3. Weight
4. Throwing Mechanism
5. Base
6. Control Unit
7. Pushing Member
8. Adjuster
9. Motor
10. Transfer Member
11. Guide
12. Housing
13. Hook
14. Ring The test system (1) comprises a chassis (2); a throwing mechanism (4) which is located at an upper part of the chassis (2), onto which at least one weight (3) is attached and which provides throwing the weight (3) attached thereon; a base (5) which is located at a lower part of the chassis (2) and onto which a weight (3) is thrown by the throwing mechanism (4); a control unit (6) for throwing the weight (3) by means of the throwing mechanism (4); and at least one pushing member (7) for throwing the weight (3) by pushing, which is located on the throwing mechanism (4) and operated by the control unit (6) (FIG. 1).

Figure 2:
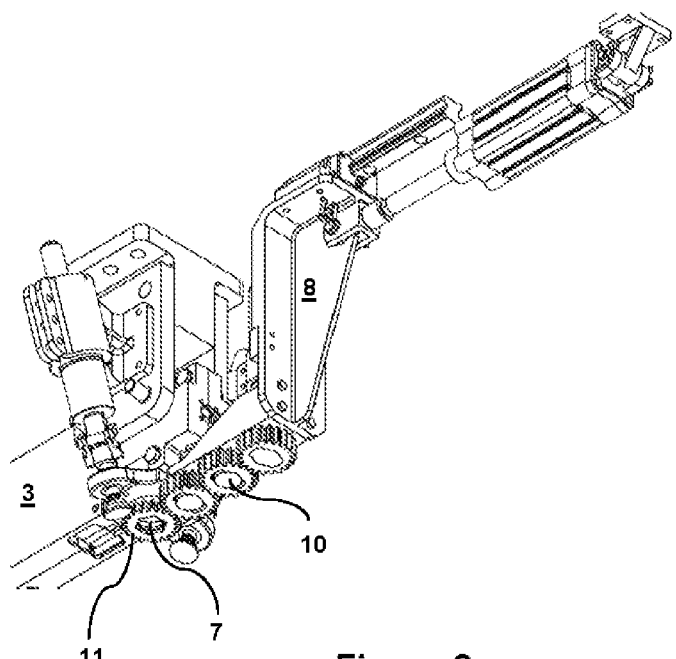
FIG. 2 is a partial perspective view of a throwing mechanism and a perspective view of an adjuster.

The test system (1) of the present invention comprises at least one adjuster (8) which is operated by the control unit (6), located on the chassis (2) so as to be able to move towards or away from the pushing member (7), and moves the pushing member (7) to provide contact of the pushing member (7) to the weight (3) (FIG. 2).

The weight (3) is thrown out of the throwing mechanism (4) by means of the control unit (6). When weight (3) falls onto the base (5), its position on the base (5) is changed by means of positioners (P) so as to be re-attached to the throwing mechanism (4) such that the weight (3) faces the throwing mechanism (4). The test system (1) has a control unit (6) which controls re-attachment of weight (3) provided on the base (5) to the throwing mechanism (4) by moving the base (5) closer to the throwing mechanism (4), thus enabling the throwing unit (4) to be test automatically. Throwing the weight (3) out of the throwing mechanism (4) and re-attaching the same to the throwing mechanism (4) is performed repeatedly. Therefore, it is controlled whether the throwing mechanism (4) operates properly. Thus, life test is performed on the throwing mechanism (4) in a fully automatic way without human intervention.

Figure 3:
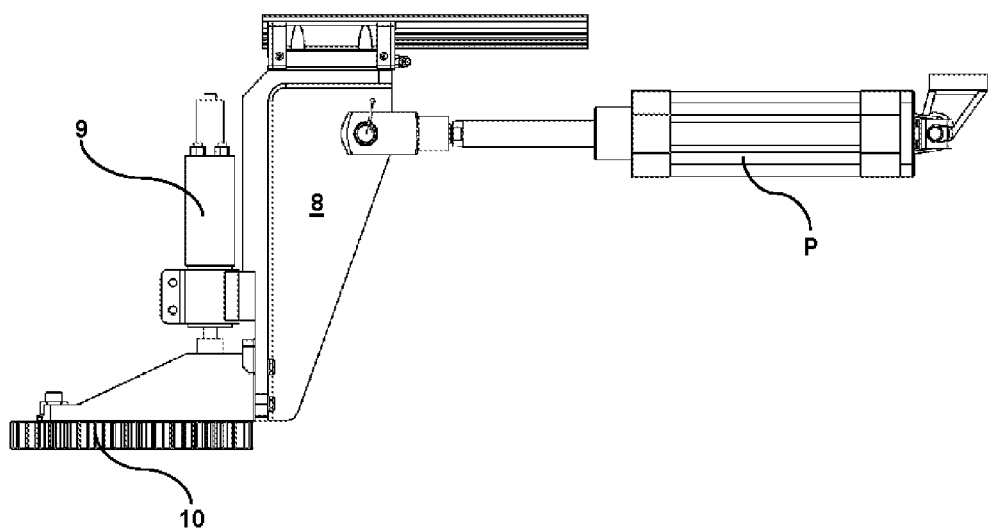
FIG. 3 is a front view of an adjuster.

The pushing member (7), which is located at the throwing mechanism (4) and provides throwing the weight (3) by pushing, is triggered by means of the control unit (6). The pushing member (7) is located on the throwing mechanism (4) so as to be able to move up and down. The control unit (6) is able to control up and down movement of the pushing member (7). The adjuster (8) is located on the chassis (2) so as to be able to move towards and away from the throwing mechanism (4) preferably by means of a piston (P). The adjuster (8) is operated by the control unit (6). Before starting throwing operation, the adjuster (8) is moved towards the pushing member (7) by the control unit (6) so that it can trigger the pushing member (7). The adjuster (8) which provides triggering the pushing member (7) and moving it towards the weight (3) stops when the pushing member (7) contacts weight (3). The adjuster (8) is moved away from the pushing member (7) before throwing operation starts. Upon downwards extension of the pushing member (7) by means of the control unit (6), the weight (3) is thrown out of the throwing mechanism (4) to the base (5). Following the throwing operation, the pushing member (7) is pulled up by the control unit (6). In order to avoid weight (3) from hitting the pushing member (7) before the weight (3) is re-attached to the throwing mechanism (4), the adjuster (8) provides bringing the pushing member (7) to a predetermined height. Therefore, before pushing member (7) fully contacts the weight (3) by means of the adjuster (8) prior to throwing operation and before the weight (3) is re-attached to the throwing mechanism (4) following the throwing operation, the pushing member (7) is enabled to be pulled up by a predetermined amount in order to avoid weight (3) from hitting the pushing member (7). By this way, the adjuster (8) provides ensuring zero gap between the pushing member (7) and the weight (3) before throwing operation and contact of the pushing member (7) to the weight, and provides avoiding the weight (3) from hitting the pushing member (7) when it lifted up while the weight (3) is re-attached to the throwing mechanism (4) (FIG. 3).

In an embodiment of the invention, the test system (1) comprises an adjuster (8) which triggers the pushing member (7) to enable the pushing member (7) to move along the axis that it extends lengthwise by rotating around its own axis. Adjuster (8) which is moved towards the pushing member (7) by the control unit (6) triggers the pushing member (7) so that the pushing member (7) moves along the direction that it extends lengthwise such that it moves away from the throwing mechanism (4) and moves towards the weight (3) by rotating clockwise around its own axis. Adjuster (8) operated by the control unit (6) triggers the pushing member (7) to provide moving the pushing member (7) such that it moves away from the weight (3) by rotating counter clockwise around its own axis.

In an embodiment of the invention, the test system (1) comprises a pushing member (7) which has a first position (I) in which the pushing member (7) is provided on the throwing mechanism (4), a second position (II) in which the pushing member (7) is brought from the first position (I) by being rotated around its own axis by means of the adjuster (8) and contacts the weight (3), and a third position (III) in which the pushing member (7) extends from the throwing mechanism (4) towards the weight (3) by means of the control unit (6) and which provides throwing the weight (3) by pushing it downwards. Before the third position (III), the pushing member (7) is brought to the second position (II) by the control unit (6) via the adjuster (8). In the second position (II), the pushing member (7) contacts the weight (3). Thus, it is enabled that the weight (3) is thrown efficiently by being pushed by the pushing member (7).

In an embodiment of the invention, the test system (1) comprises a pushing member (7) which is pulled upwards from the third position (III) by means of the control unit (6) so as to be brought into the first position (I), and has a fourth position (IV) in which the pushing member (7) is brought from the first position (I) to a predetermined height by being rotated around its own axis by means of the adjuster (8). Pushing member (7) is brought to a fourth position (IV) higher than the first position (I) while or just before the weight (3) is lifted up for being attached to the throwing mechanism (4). Thus, the weight (3) is avoided from hitting the pushing member (7) while weight (3) is attached to the throwing mechanism (4).

In an embodiment of the invention, the test system (1) comprises a motor (9), and an adjuster (8) having at least one transfer member (10) which makes a rotational movement around its own axis by the movement received from the motor (9). The transfer member (10) triggered by motor (9) triggers the pushing member (7) with the movement around its own axis.

In an embodiment of the invention, the test system (1) comprises a transfer member (10) whose rotational movement around its own axis terminates upon contact of the pushing member (7) to the weight (3). With the rotational movement of the transfer member (10) around its own axis which is triggered by the motor (9), contact of the pushing member (7) to the weight (3) is terminated. Therefore, the pushing member (7) is efficiently brought to the second position (II).

Figure 4:
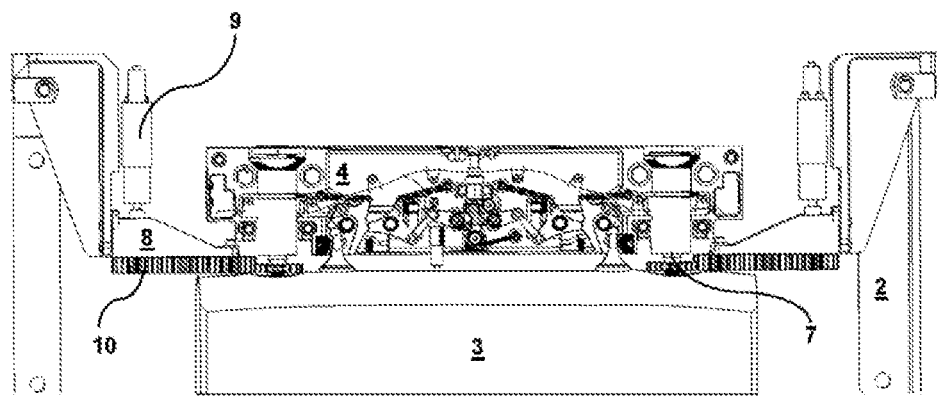
FIG. 4 is a front view of a throwing mechanism, a weight and an adjuster.

In an embodiment of the invention, the test system (1) comprises a transfer member (10) whose rotational movement around its own axis terminates upon contact of the pushing member (7) to the weight (3) due to the power of motor (9). The power of the motor (9) is not sufficient to compensate frictional force that is created by contact of the pushing member (7) to the weight (3). Therefore, it is provided that the pushing member (7) is efficiently brought to the second position (II) and kept in the second position (II) only by the power of motor (9), without requiring any additional control mechanisms or systems (FIG. 4).

In an embodiment of the invention, the test system (1) comprises at least one guide (11) which is located on the pushing member (7), triggered by the transfer member (10), and thus enabling the pushing member (7) to rotate around its own axis. In order to be able to bring the pushing member (7) located on the throwing mechanism (4) to the second position (II) or fourth position (IV) by the adjuster (8) in an easy manner, the guide (11) is located on the pushing member (7) in the test system (1). Thanks to the guide (11), the pushing member (7) can be lifted up or down by being rotated around its own axis by means of the adjuster (8).

Figure 5:
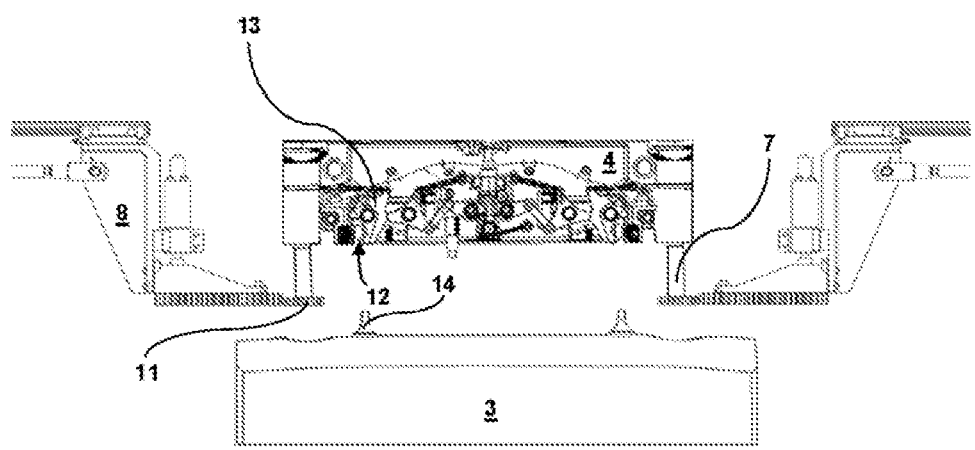
FIG. 5 is a front view of a throwing mechanism, a weight and an adjuster.

In an embodiment of the invention, the test system (1) comprises a transfer member (10) in the form of a gear, and a guide (11) in the form of a gear. Gears of the transfer member (10) triggered by the motor (9) trigger the gears which are located on the guide (11). By this way, the guide member (11) nearly completely surrounding the pushing member (7) rotates around its own axis and makes the pushing member (7) rotate around its own axis, as well (FIG. 5).

In an embodiment of the invention, the test system (1) comprises a transfer member (10) having a wider gear structure than the guide (11). Therefore, the pushing member (7) can be effortlessly triggered by the transfer member (10) while making up or down movement.

In an embodiment of the invention, the test system (1) comprises at least one housing (12) located on the throwing mechanism (4), at least one hook (13) located in the housing (12), and at least one ring (14) which is located on the weight (3), extends outwards from the weight (3) and held by the hook (13) when the weight (3) is attached to the throwing mechanism (4).

In an embodiment of the invention, the test system (1) comprises a throwing mechanism (4) suitable for use in air vehicles to throw a weight (3). The throwing mechanism (4) provides releasing and/or throwing the weight (3) of the ammunition type out of an air vehicle to a target.

In an embodiment of the invention, the test system (1) enables the throwing mechanism (4) used in air vehicles to be tested. Thanks to the test system (1), the weight (3) of the ammunition type is automatically thrown out of the throwing mechanism (4) and re-attached to the throwing mechanism (4) automatically. Therefore, the throwing mechanism (4) is operated more than once, and a life test is performed automatically thereon with zero-touch.

Thanks to the test system (1) of the present invention, throwing mechanisms (4) which are used to throw weight (3) such as ammunition, etc. can be tested independently of the manpower; thus, an easy-to-use, practical, effective, efficient and reliable test system (1) is achieved.

The invention claimed is:

1. A test system (1) comprising:
 a chassis (2);
 a throwing mechanism (4) which is located at an upper part of the chassis (2), onto which at least one weight (3) is attached and which provides throwing the at least one weight (3) attached thereon;
 a base (5) which is located at a lower part of the chassis (2) and onto which the at least one weight (3) is thrown by the throwing mechanism (4);
 a control unit (6) for throwing the at least one weight (3) by means of the throwing mechanism (4);
 at least one pushing member (7) for throwing the at least one weight (3) by pushing, which is located on the throwing mechanism (4) and operated by the control unit (6); and
 at least one adjuster (8) which is operated by the control unit (6), located on the chassis (2) so as to be able to move towards or away from the at least one pushing member (7), and moves the at least one pushing member (7) to provide contact of the at least one pushing member (7) to the at least one weight (3).

2. The test system (1) according to claim 1, wherein the at least one adjuster (8) triggers the at least one pushing member (7) to enable the at least one pushing member (7) to move along the axis that it extends lengthwise by rotating around its own axis.

3. The test system (1) according to claim 1, wherein the at least one pushing member (7) has a first position (I) on the throwing mechanism (4), a second position (11) in which the at least one pushing member (7) is brought (I) by being rotated around its own axis by means of the at least one adjuster (8) and contacts the at least one weight (3), and a third position (III) in which the at least one pushing member (7) extends from the throwing mechanism (4) towards the at least one weight (3) by means of the control unit (6) and which provides throwing the at least one weight (3) by pushing it downwards.

4. The test system (1) according to claim 3, wherein the at least one pushing member (7) is pulled upwards from the third position (III) by means of the control unit (6) so as to be brought into the first position (I), and has a fourth position (IV) in which the at least one pushing member (7) is brought from the first position (I) to a predetermined height by being rotated around its own axis by means of the at least one adjuster (8).

5. The test system (1) according to claim 1, comprising a motor (9), and wherein the at least one adjuster (8) having at least one transfer member (10) which makes a rotational movement around its own axis by the movement received from the motor (9).

6. The test system (1) according to claim 5, wherein the transfer member (10) has a rotational movement around its own axis that terminates upon contact of the at least one pushing member (7) to the at least one weight (3).

7. The test system (1) according to claim 5, wherein the transfer member (10) has a rotational movement around its own axis that terminates upon contact of the at least one pushing member (7) to the at least one weight (3) due to the power of motor (9).

8. The test system (1) according to claim 5, comprising at least one guide (11) which is located on the at least one pushing member (7), triggered by the transfer member (10), and thus enabling the at least one pushing member (7) to rotate around its own axis.

9. The test system (1) according to claim 8, wherein the transfer member (10) has the form of a gear, and the guide (11) has the form of a gear.

10. The test system (1) according to claim 8, wherein the transfer member (10) has a wider gear structure than the guide (11).

11. The test system (1) according to claim 1, comprising at least one housing (12) located on the throwing mechanism (4), at least one hook (13) located in the housing (12), and at least one ring (14) which is located on the at least one weight (3), extends outwards from the at least one weight (3) and held by the hook (13) when the at least one weight (3) is attached to the throwing mechanism (4).

* * * * *